(12) United States Patent
Staudt et al.

(10) Patent No.: US 6,442,826 B1
(45) Date of Patent: Sep. 3, 2002

(54) METHOD FOR MANUFACTURING A FLUSH/ SEMI-FLUSH THREADED CONNECTION

(75) Inventors: John J. Staudt, Friendswood; Doyle E. Reeves, Houston, both of TX (US)

(73) Assignee: Hunting Oilfield Services, Inc., Houston, TX (US)

( * ) Notice: Subject to any disclaimer, the term of this patent is extended or adjusted under 35 U.S.C. 154(b) by 0 days.

(21) Appl. No.: 09/580,997

(22) Filed: May 23, 2000

(51) Int. Cl.[7] .................................................. B23P 13/04

(52) U.S. Cl. .............................. 29/558; 409/66; 409/76

(58) Field of Search ............................. 29/558, 407.02, 29/456; 82/110; 409/66, 74, 75, 76

(56) References Cited

U.S. PATENT DOCUMENTS

| | | | |
|---|---|---|---|
| 3,083,043 A | * 3/1963 | Thornhill | |
| 4,127,927 A | * 12/1978 | Hawk et al. | ......... 29/407.02 X |
| 4,186,631 A | * 2/1980 | Grider | |
| 4,375,708 A | * 3/1983 | Hellnick et al. | |
| 4,707,001 A | 11/1987 | Johnson | .................... 285/332.3 |
| 4,728,129 A | 3/1988 | Morris | ....................... 285/334 |
| 5,007,665 A | 4/1991 | Bovisio et al. | .............. 285/334 |
| 5,064,224 A | 11/1991 | Tai | ............................... 285/94 |
| 5,454,605 A | * 10/1995 | Mott | |
| 5,505,502 A | 4/1996 | Smith et al. | ................. 285/334 |

OTHER PUBLICATIONS

Page from Vetco catalog.

* cited by examiner

Primary Examiner—David P. Bryant
Assistant Examiner—Steve Blount
(74) Attorney, Agent, or Firm—Bracewell & Patterson, LLP

(57) ABSTRACT

A method for manufacturing pipe joints for connecting two pipe sections in a well bore allows the pipe joint to have increased resistance to compressive and torsional forces. Each pipe joint has a box member for matingly engaging a pin member, the pin member being threadingly connected to the box member to create the pipe joint. Threads are created for the pin member on a tapered exterior surface of a pipe, the threads being axially disposed between a pin end terminal surface and an external shoulder. A tapered surface having a recess is created for the box member on an interior of a pipe, the tapered surface being axially located between a box end terminal surface of the pipe and an internal shoulder, the recess being axially located just behind the box end terminal surface of the pipe. Threads are cut into the tapered surface of the box member, the threads beginning behind the recess and traveling axially away from the box end terminal surface. Since the threading pass for the box member begins behind the recess, threads are not cut through the box end terminal surface giving, this surface an increased contact area. When the pin member and the box member are threadingly connected, the box end terminal surface engages the external shoulder of the pin member. The increased area of the box end terminal surface gives the pipe joint increased compressive and torsional resistance.

12 Claims, 5 Drawing Sheets

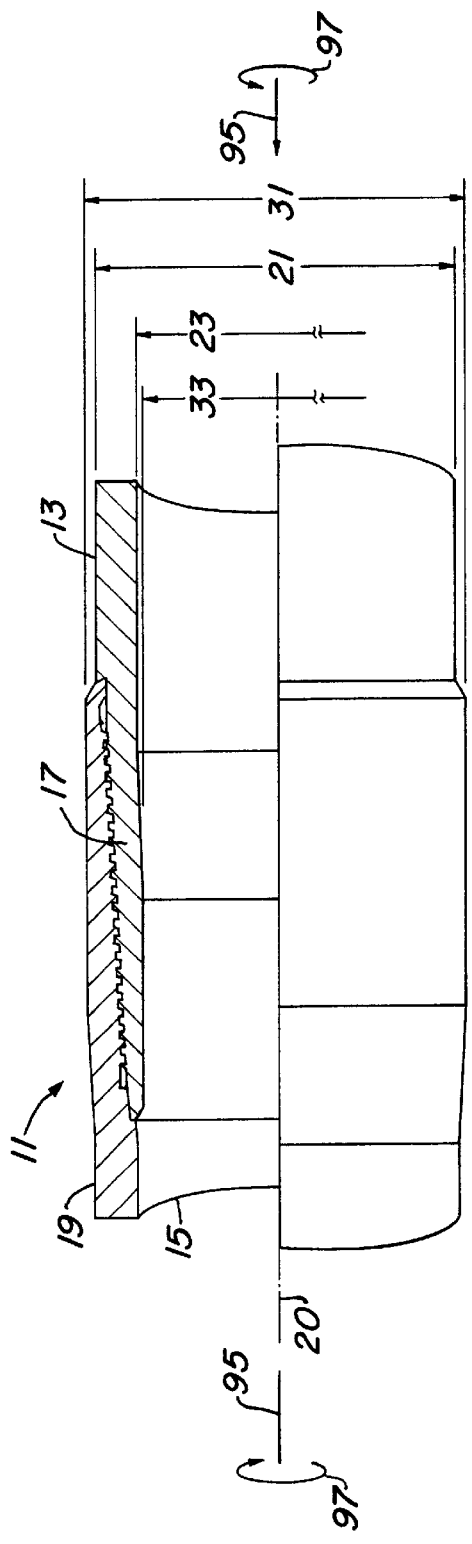
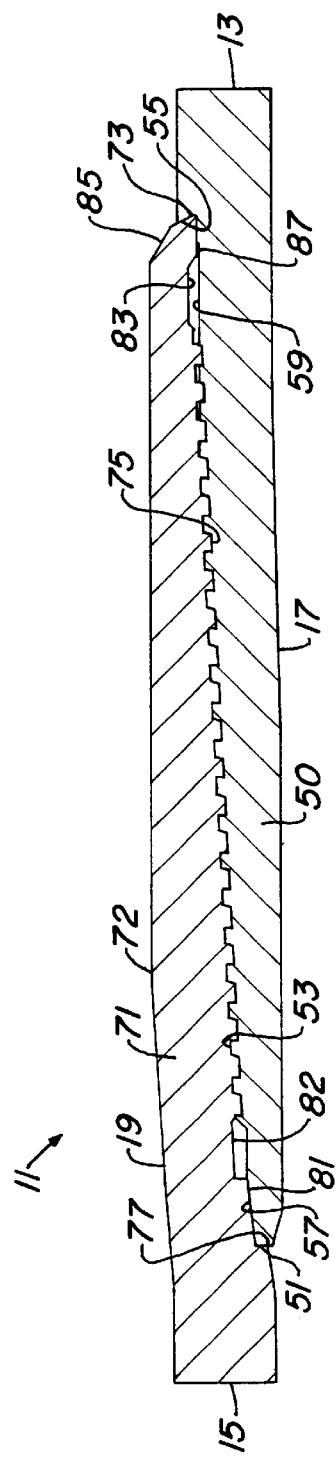
Fig. 1
Fig. 2

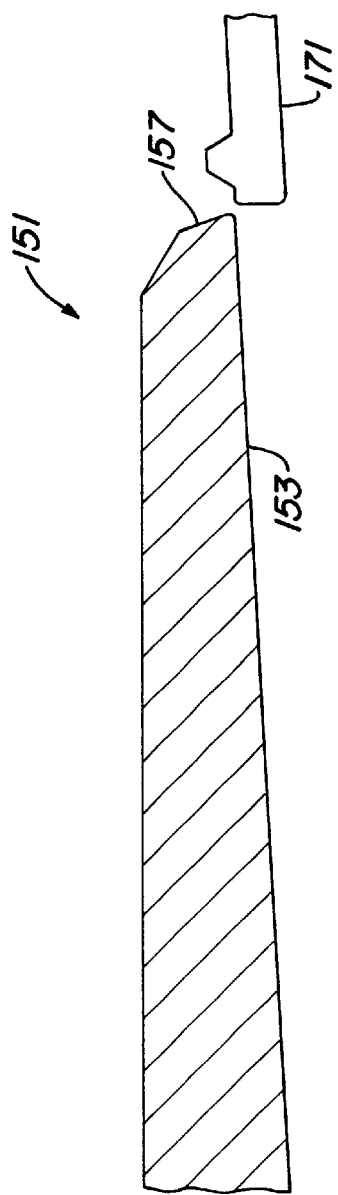
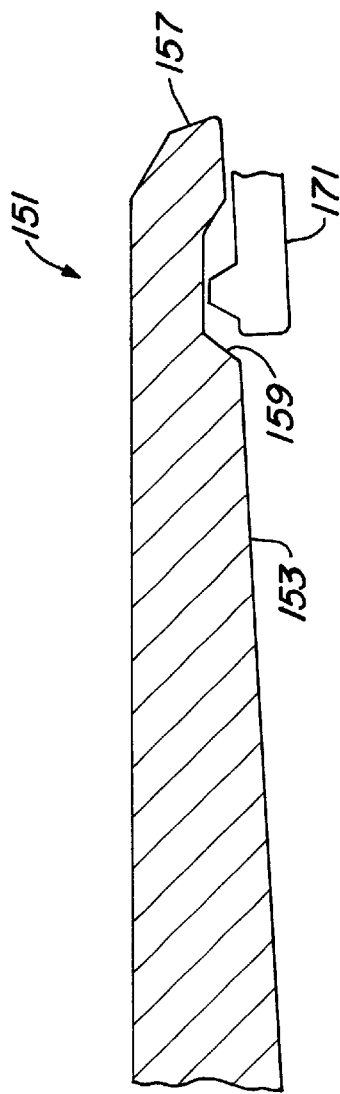

METHOD FOR MANUFACTURING A FLUSH/ SEMI-FLUSH THREADED CONNECTION

BACKGROUND OF THE INVENTION

1. Field of the Invention

This invention relates in general to connections for forming pipe joints and in particular to a method for manufacturing a flush or semi-flush threaded pipe connection in which changes in the machining make more efficient use of available wall thickness in order to increase the compressive and torsional resistance of the pipe joint.

2. Description of Related Art

In a pipe string having a series of joints, each joint having a pin member threadingly connected to a box member, it is desirable to have pipe joints that are especially resistant to compressive and torsional forces, as well as tension and pressure. Compressive forces are often encountered during temperature changes in the well bore, or when running a pipe string into a highly deviated or horizontal well. If the pipe string encounters an obstruction or "bottoms-out" at the bottom of the well bore, the weight of the pipe string can be transferred to any or all of the pipe joints, also creating compressive stresses within the affected pipe joints. Torsional forces are applied to the pipe joints during assembly of the pipe string and are also encountered as a part of normal drilling operations. Horizontal drilling operations present a special case situation in which torsional and compressive forces can become significant. In order to run a pipe string into a highly deviated, or horizontal well bore, the pipe string is often rotated about its longitudinal axis during insertion. The horizontal orientation of the pipe, as well as contact with the bore hole, creates torsional stresses within each pipe joint. When a rotating string encounters the curved section, or build interval of the well bore, alternating tensile and compressive stresses are generated from the associated bending.

The resistance provided by an integral pipe joint to compressive and torsional forces is generally dictated by the surface area of contact of selective regions of the pin member and the box member. The area of contact that contributes most to the compressive and torsional strength of the pipe joint is that between an external shoulder located on the pin member and a box end terminal surface located on the box member. The effective area of the box end terminal surface is typically small due to efforts to reduce pipe wall thicknesses. This area is also reduced due to threading operations, which generally cut threads through the box end terminal surface, thereby decreasing its effective surface area.

If more efficient use were made of the available wall thickness, particularly in the box end terminal surface, improved compressive and torsional resistance would result.

U.S. Pat. No. 4,728,129 shows a connector for tubing and casing joints in which the pin member of the joint includes a tapered stop shoulder.

U.S. Pat. No. 5,505,502 shows a connector for pipe-riser sections in an offshore installation. The pin and box members both include thin-walled sealing extensions or lips.

U.S. Pat. No. 5,064,224 shows an oil field tubular connection which features a long, slightly thinner wall portion at the pin end of the connection between the threads and the metal-to-metal seal "to allow tubing pressure to increase the sealing effectiveness of the metal-to-metal seal."

U.S. Pat. No. 5,007,665 shows a joint for well casing which includes a pin member with a conically shaped seat and a facing surface.

None of the above references teach a pipe joint having an enlarged box end terminal surface to increase the compressive and torsional strength of the pipe joint. Additionally, none of these references show a recess being used just behind the box end terminal surface to allow the threading operation to begin behind the recess.

A need continues to exist for a simple and economical method for manufacturing pipe joints with improved integrity.

A need specifically exists for such a method which adds increased torsional and compressive resistance to the pipe joint so manufactured.

A need also exists for such a method which does not add appreciably to the costs of the pipe joint manufacturing process, which is simple to implement, and which is reliable in operation.

BRIEF SUMMARY OF THE INVENTION

The method of manufacturing a pipe connection according to the present invention allows the surface area of a box end terminal surface to be increased. Upon make-up, the compressive and torsional resistance of the pipe connection are increased. A pipe string is made up of a series of connections or joints utilizing the manufacturing method of the invention with each joint having a coupling member and a pin member which are threadingly connected.

The pin member is machined onto one end of a plain end pipe by first profiling the pipe to create a tapered surface on an exterior of the pipe. An external shoulder is also created during the profiling step, the tapered surface being axially bounded by a pin end terminal surface at an outer extent of the pin member and the external shoulder at an opposite extent thereof. After creating the tapered surface, a plurality of threads are cut into the tapered surface.

The box member is machined on one end of a plain end pipe by first profiling a tapered surface on an interior of the pipe having a mouth opening. An internal shoulder is created during the profiling step, the tapered surface being axially bounded by a box end terminal surface adjacent the mouth opening of the box member at one extent and the internal shoulder at an opposite extent. After creating the tapered surface and prior to threading, a recess is circumferentially cut into the tapered surface on the pipe interior just behind the box end terminal surface.

A plurality of threads are cut into the internal surface of the box member. Instead of beginning the threading pass in front of the box end terminal surface (as does the traditional method), a cutting tool is placed in the recess, and the threading pass is started behind the recess. This process cuts threads in the internal surface between the recess and the internal shoulder. Since the threading process does not pass through the box end terminal surface, the structural integrity of the box end terminal surface is maintained, which gives the surface a greater surface or contact area.

The box member and the pin member are threadingly connected so that the internal shoulder of the box member engages the pin end terminal surface. More important, when the box member and pin member are fully connected, the box end terminal surface engages the external shoulder of the pin member. Since the box end terminal surface has an increased surface area (when compared to conventionally manufactured box members), the compressive and torsional resistance of the pipe joint are greatly increased.

Additional objects, features, and advantages will be apparent in the written description which follows.

BRIEF DESCRIPTION OF THE DRAWINGS

FIG. 1 is a partial cross-sectional side view of a pipe joint created using the method of the present invention.

FIG. 2 is a detailed cross-sectional side view showing the threads of the pipe joint of FIG. 1.

FIG. 6 is a detailed cross-sectional side view of the box end of FIG. 5, prior to threading, showing a cutting tool positioned to cut threads according to a traditional method.

FIG. 7 is a detailed cross-sectional side view of the box end of FIG. 5, showing a cutting tool positioned to cut threads according to the method of the present invention.

DETAILED DESCRIPTION OF THE PREFERRED EMBODIMENT

Figure 3:
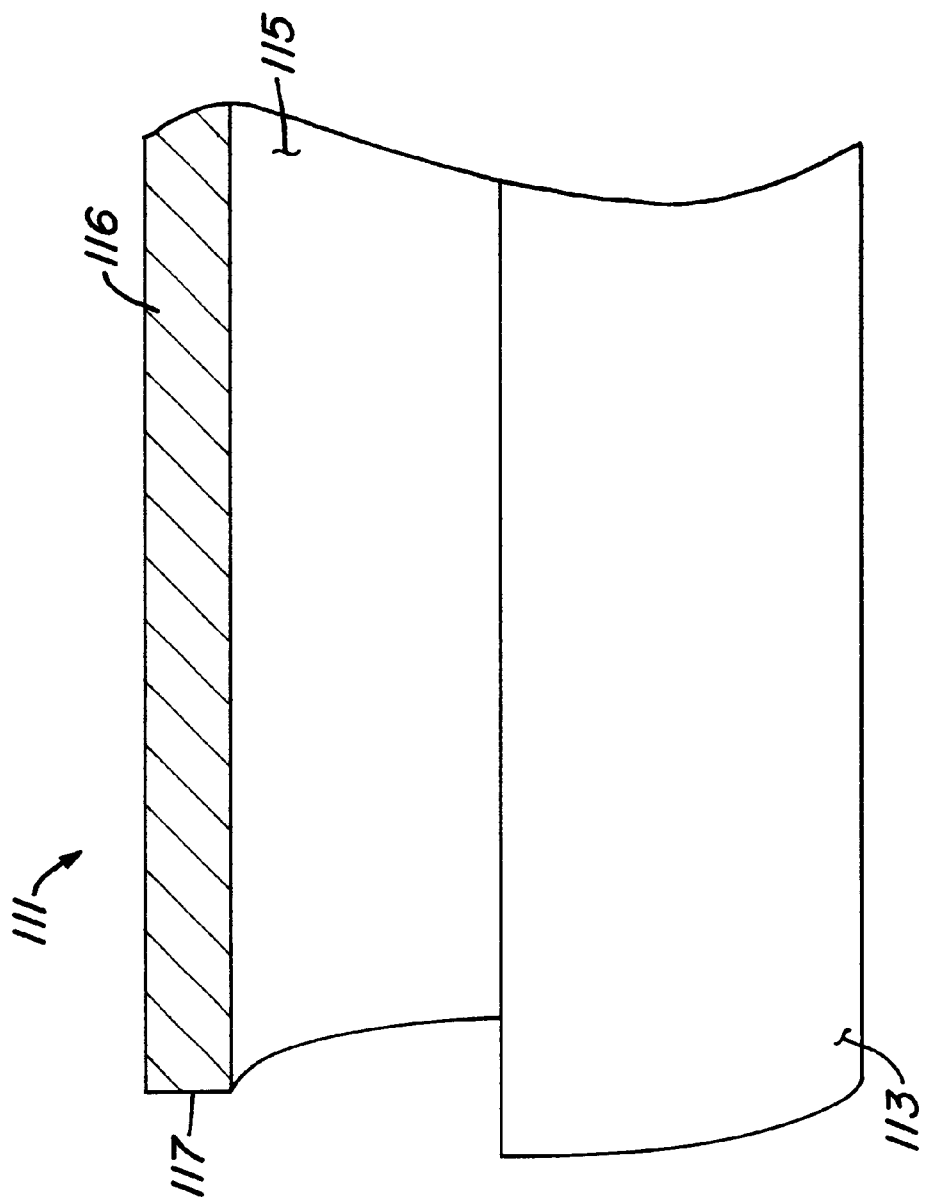
FIG. 3 is a partial cross-sectional side view of a plain end pipe used with the method according the current invention.

Referring to FIG. 1 in the drawings, a pipe joint 11 forms a connection between two pipe sections 13, 15. Pipe joint 11 is a typical integral connection comprised of a pin member 17 on one end of pipe 13 and a box member 19 on one end of pipe 15, both pipes sharing a longitudinal axis 20 when fully connected. Both pipe sections 13, 15 have a nominal outer diameter 21 and a nominal inner diameter 23. The pipe joint illustrated in FIG. 1 is a semi-flush connection. In a semi-flush connection, the outer diameter 21 of the pipe 15 at the box member 19 is increased to outer diameter 31. This is done by a cold forming process that is described in more detail below. The inner diameter 23 of the pipe 13 at the pin member 17 is decreased by cold forming to inner diameter 33.

A flush connection (not shown) is one in which both pipes have constant diameters throughout the axial length of the box member. The inner diameter of the pin member may or may not be swaged inward. Although no flush connections are shown in the drawings, it should be understood that the method according to the present invention is equally suited to either a flush connection or a semi-flush connection.

Referring to FIG. 2, a more detailed view of pipe joint 11 is illustrated. Pin member 17 has a cylindrical wall 50, a pin end terminal surface 51, a plurality of external tapered threads 53, and an external shoulder 55. External threads 53 are disposed circumferentially around an exterior of wall 50 and are axially disposed between pin end terminal surface 51 and external shoulder 55. A mean diameter of external threads 53 gradually increases, with a minimum diameter being nearer to pin end terminal surface 51 and a maximum diameter being nearer to external shoulder 55.

External threads 53 preferably have a tapered thread form. However, it is conceivable that the threads used in conjunction with the method of the present invention could be non-tapered threads. The advantages of the present invention exist regardless of whether the threads have a tapered thread form or a straight thread form.

A pin sealing surface 57 is disposed circumferentially around the exterior of wall 50. The pin sealing surface 57 is axially located between the pin end terminal surface 51 and the external threads 53 at their 53 smallest diameter. Pin sealing surface 57 engages a similar surface on box member 19 when the two pipe sections are connected (discussed in more detail below).

An approach surface 59 is also disposed circumferentially around the exterior of wall 50. Approach surface 59 is axially located between the external threads 53 at the their largest diameter and the external shoulder 55. Approach surface 59 has less of an incline relative to longitudinal axis 20 than do external threads 53. The approach surface 59 allows proper clearance and fit for box member 19 when the pin member 17 and the box member 19 are being assembled to form pipe joint 11.

Box member 19 has a cylindrical wall 71, an outer surface 72, a box end terminal surface 73, a plurality of internal tapered threads 75, and an internal shoulder 77. Internal threads 75 are disposed circumferentially around an interior of wall 71 and are axially disposed between box end terminal surface 73 and internal shoulder 77. The mean diameter of the internal threads 75 gradually decreases, with a maximum diameter being nearer to the box end terminal surface 73 and a minimum diameter being nearer to the internal shoulder 77.

Internal threads 75 preferably have a tapered thread form. However, like the external threads 53, it is conceivable that the threads could be non-tapered threads. Regardless of whether thread form is tapered or straight, internal threads 75 must be of the same general thread form as external threads 53 so that the threads 53, 75 matingly engage when the pipes 13, 15 are connected.

A box sealing surface 81 is disposed circumferentially around the interior of wall 71. The box sealing surface 81 is axially located between the internal shoulder 77 and the internal threads 75 at their smallest diameter. A relief groove 82 is circumferentially cut into the interior of wall 71. The relief groove 82 is axially positioned between box sealing surface 81 and internal threads 75. Relief groove 82 eliminates dope entrapment between internal threads 75 and external threads 53.

A recess 83 is cut into the interior of wall 71 and is axially positioned between the internal threads 75 at their largest diameter and the box end terminal surface 73. A box approach surface 87 is also circumferentially located on the interior of wall 71. Box approach surface is axially positioned between recess 83 and box end terminal surface 73. As pipes 13, 15 are being connected to form pipe joint 11, the box approach surface 87 is adapted to slightly clear pin approach surface 59. By preventing interference between the approach surfaces 59, 87, the box end terminal surface 73 is allowed to properly mate with the external shoulder 55.

A transition surface 85 is situated between outer surface 72 and box end terminal surface 73. Transition surface 85 is shown at an incline to box end terminal surface 73, but it is conceivable that transition surface 85 could be omitted such that the box end terminal surface is directly adjacent to the outer surface 72 of the box member 19.

Pipe joint 11 is created by threadingly connecting pin member 17 to box member 19. When fully connected, pin sealing surface 57 mates with box sealing surface 81. This mating connection between the surfaces 57, 81 seals pipe joint 11 so that fluid flowing within pipes 13, 15 remains in the pipes. In the preferred embodiment, pin end terminal surface 51 mates with internal shoulder 77 of box member 19.

While the mating of surfaces 51, 77 does add to the overall strength of the pipe joint 11, the primary strength of the joint 11 comes from the mating engagement between box end terminal surface 73 and external shoulder 55. The surface area or area of contact provided by the mating of the box end terminal surface 73 and the external shoulder 55 greatly contribute to the torsional and compressive strength of the pipe joint 11. As this surface area is increased, so to is the overall strength of the pipe joint 11.

The method according to the present invention is aimed at increasing the surface area of the box end terminal surface 73 in order to increase the torsional and compressive resistance of the pipe joint 11. Referring briefly to FIG. 1, the compressive forces 95 experienced by pipe joint 11 during normal use are illustrated. Compressive forces 95 are experienced by the pipe joint when the pipe string bottoms out at the bottom of a well bore, and the weight of the pipes in the pipe string is transferred to the pipe joint 11. Torsional forces 97 are experienced when the pipe string is rotated about longitudinal axis 20. Such torsional forces 97 often occur when assembling a pipe string and when performing horizontal drilling operations, as has been previously mentioned.

Referring to FIGS. 3–7, the method according to the present invention is illustrated. Both pin member 17 and box member 19 are manufactured from a plain end pipe 111 (shown in FIG. 3). Plain end pipe 111 has an outer surface 113, an inner surface 115, a cylindrical wall 116, and a forward face 117, the forward face 117 being located on each end of the pipe. For each pipe section 13, 15 in a drill string, the box member 19 will be machined on one end of the pipe section 13, 15, and the pin member 17 will be machined on the opposite end. This allows each pipe section 13, 15 to be connected to other pipes. Plain end pipe 111 is merely the starting point for manufacture of a pipe section 13, 15 having a box member 19 and a pin member 17.

Figure 4:
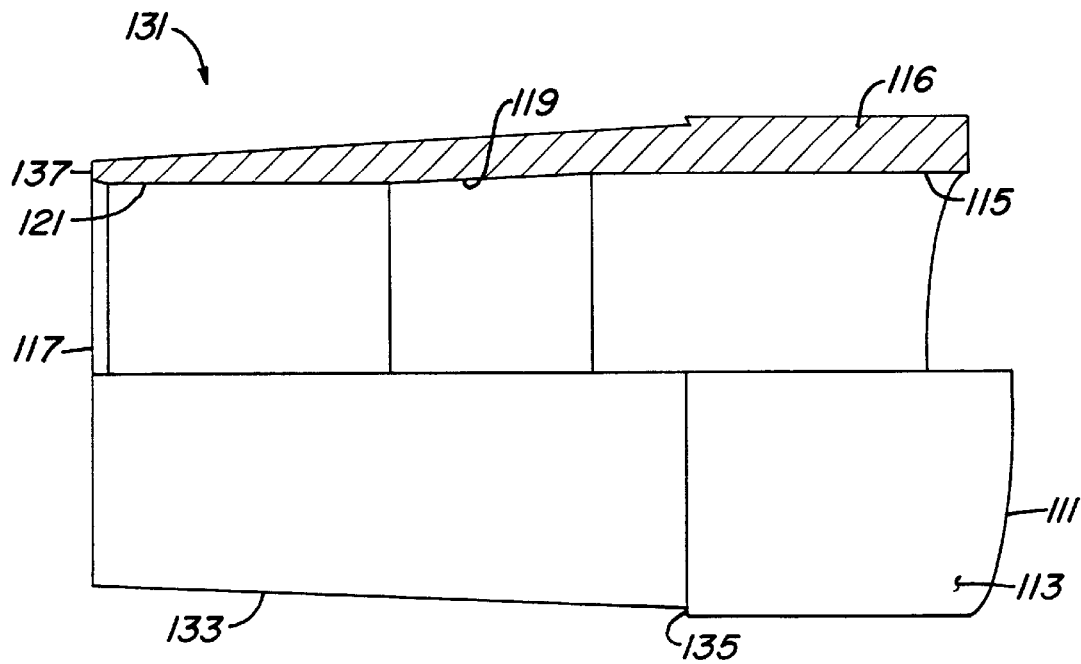
FIG. 4 is a partial cross-sectional side view of a pin end showing a tapered surface machined on the exterior of the plain end pipe of FIG. 3.

If a semi-flush connection (as opposed to a flush connection) is being created, plain end pipe 111 is subjected to a cold forming process before any profiling or threading operations. This swaging process is applied to the pin member end of a plain end pipe 111 to reduce the inner and outer diameter of the pipe 111. During the swaging process, the thickness of cylindrical wall 116 remains unchanged. The effect of the swaging process on the pin member end of plain end pipe 111 is illustrated in FIG. 4. Inner surface 115 of the pipe 111 is reduced through a transition area 119 to a reduced inner surface 121.

Figure 5:
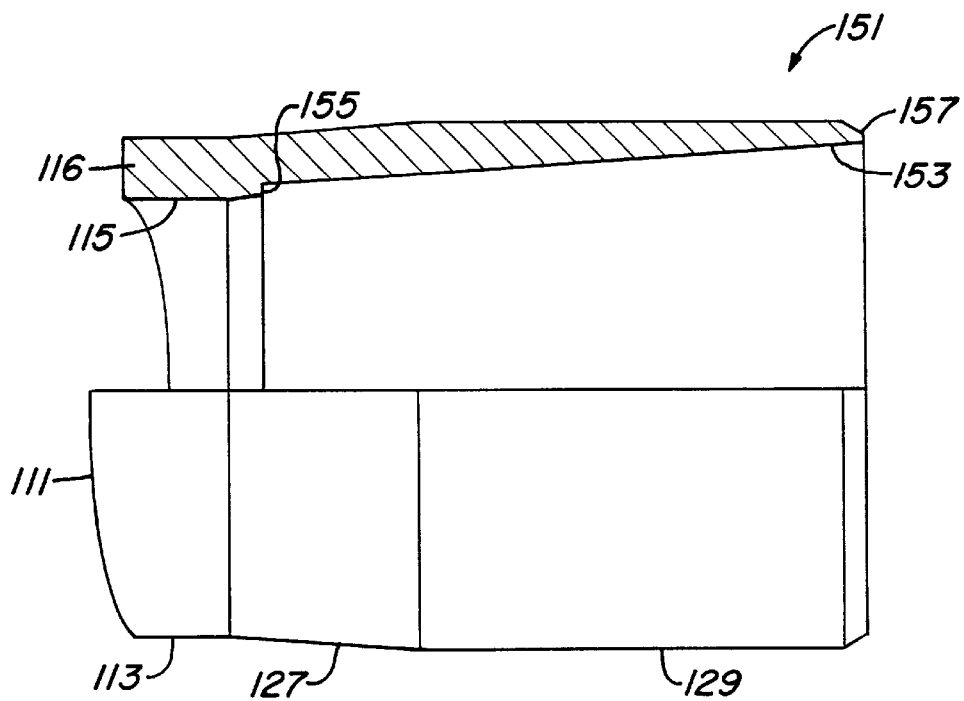
FIG. 5 is a partial cross-sectional side view of a box end showing a tapered surface machined on the interior of the plain end pipe of FIG. 3.

A similar cold forming process is performed on the box member end of plain end pipe 111. In this expansion process, the inner and outer diameter of the pipe 111 is increased. After the expansion process, the thickness of cylindrical wall 116 remains unchanged. The effect of the expansion process on the box member end of a plain end pipe 111 is illustrated in FIG. 5. Outer surface 113 of the pipe 111 is increased through a transition area 127 to an expanded outer surface 129.

Referring more specifically to FIG. 4, a pin member 131 (similar to pin member 17) is manufactured by first securing plain end pipe 111 in between the chucks of a lathe (not shown). The lathe is one potion of a computer numerical controlled (CNC) threading machine (also not shown). After securing the plain end pipe 111, outer surface 113 is profiled at one end of the pipe 111 to create a tapered surface 133 and an external shoulder 135. Tapered surface 133 begins near forward face 117 and travels axially to the external shoulder 135, the largest diameter of the tapered surface 133 being near the external shoulder 135. The creation of tapered surface 133 removes a portion of forward face 117, thus creating a pin end terminal surface 137. These preliminary steps, as well as the equipment employed, will be familiar to those skilled in the pipe threading arts, the CNC threading machines being available from a number of commercial sources.

After profiling pin member 131, a plurality of external threads (not shown but analogous to threads 53) are cut into tapered surface 133. The tapered threads enable pin member 131 to be threadingly connected to any box member to form a pipe joint.

Referring more specifically to FIG. 5, a box member 151 (similar to box member 19) is manufactured by first securing plain end pipe 111 in between the chucks of the lathe (not shown). After securing the plain end pipe 111, inner surface 115 is profiled at an end of the pipe 111 opposite pin member 131 to create a tapered surface 153 and an internal shoulder 155. Tapered surface 153 begins near forward face 117 (not shown in FIG. 5) and travels axially to the internal shoulder 155, the smallest diameter of the tapered surface 153 being near the internal shoulder 155. The creation of tapered surface 153 removes a portion of forward face 117. The portion of the forward face that remains after profiling is shaped to create box end terminal surface 157.

After profiling box member 151, a recess 159 (shown in FIG. 7) is cut into tapered surface 153. Recess 159 is analogous to recess 83 shown in FIGS. 1 and 2 and is located just behind the box end terminal surface 157. Recess 159 is important to the method of the present invention because it allows box end terminal surface 157 to have a maximum surface or contact area.

Referring more specifically to FIG. 6, a thread cutting tool 171 is positioned off of box end terminal surface 157 to illustrate the conventional method of cutting threads into tapered surface 153 of box member 151. Traditionally, cutting tool 171 is positioned in front of pipe 111 and a plurality of threads (not shown) are cut as the thread cutting tool moves circumferentially around and axially advances along the tapered surface 153. The problem with this traditional method is that threads are cut through box end terminal surface 157. This effectively reduces the surface area of the box end terminal surface 157, thereby reducing the compressive and torsional resistance of the final pipe joint 11.

Referring to FIG. 7, cutting tool 171 is positioned within recess 159 to demonstrate the thread cutting method according to the present invention. By placing the cutting tool within recess 159 and starting the threading pass only after recess 159, a plurality of internal threads (not shown but analogous to internal threads 75) are cut into tapered surface 133 between recess 159 and internal shoulder 155. The tapered threads enable box member 151 to be threadingly connected to any pin member to form a pipe joint. Because the threading pass is started after recess 159 and not in front of box end terminal surface 157, the box end terminal surface is unaffected by the threading pass. This gives box end terminal surface 157 a maximum surface or contact area, whereby upon make-up, the compressive and torsional resistance of pipe joint 11 are increased.

Figure 8:
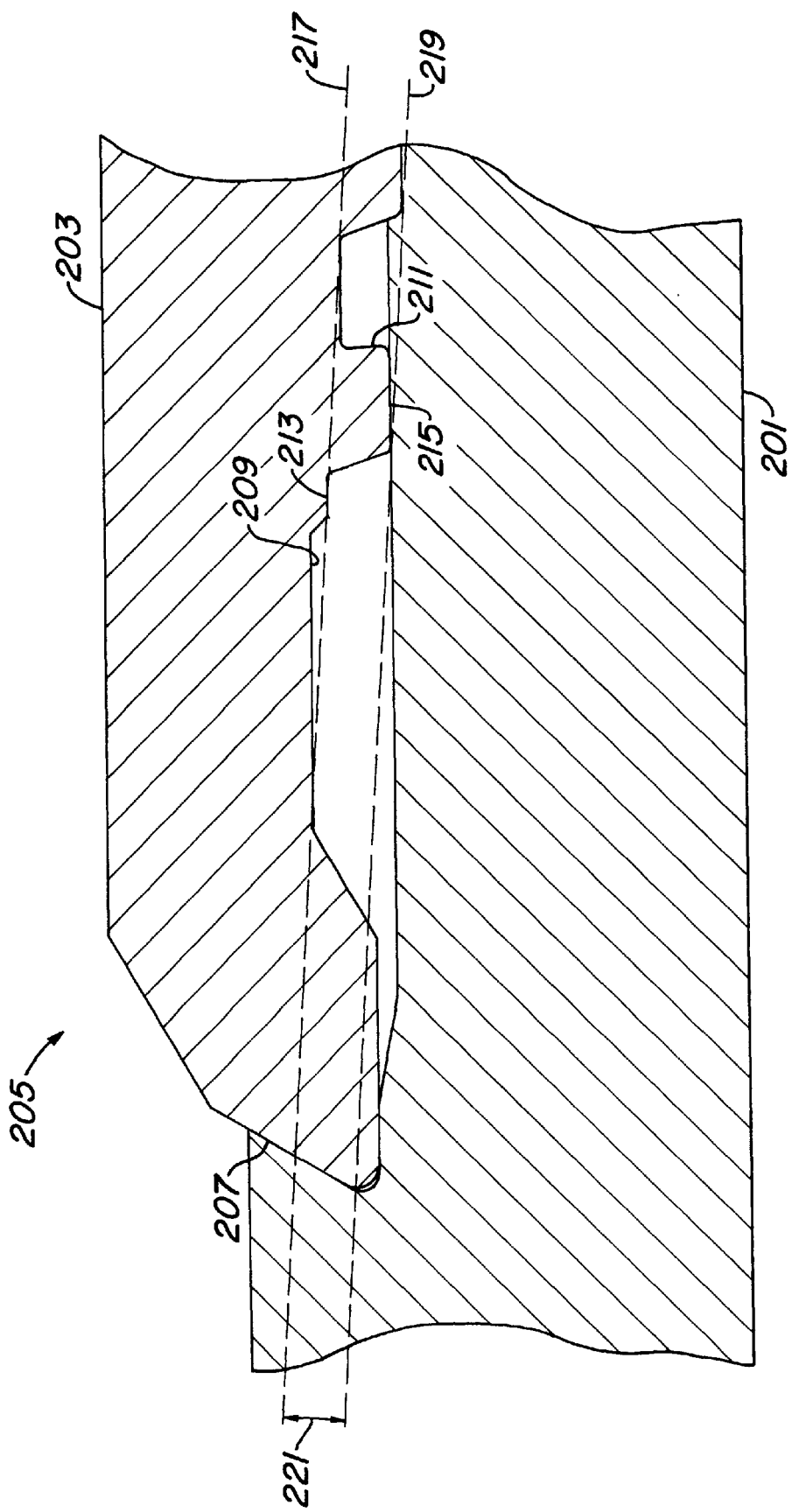
FIG. 8 is a cross-sectional side view of a pipe joint manufactured according to the current invention, showing the mating engagement between a box end terminal surface of a box member and an external shoulder of a pin member.

Referring to FIG. 8 in the drawings, the advantages of the method according to the present invention are illustrated. A pin member 201 is threadingly connected to a box member 203 to form a pipe joint 205. Both pin member 201 and box member 203 were manufactured according to the present invention. Box member 203 has a box end terminal surface 207, a recess 209, and a plurality of threads 211. Each thread 211 has a root 213 and a crest 215, the plurality of roots 213 defining a root line 217, and the plurality of crests 215 defining a crest line 219. The area between root line 217 and crest line 219 is a thread cone area 221, which defines the general path of the threads 211.

As shown in FIG. 8, the surface area of box end terminal surface 207 would be significantly reduced if the threading pass for box member 203 was started in front of the box end terminal surface 207. The surface area of box end terminal surface 207 in the thread cone area 221 comprises a large percentage of the overall surface area of box end terminal surface 207. Cutting threads through box end terminal surface 207 would greatly reduce the torsional and compressive resistance of the pipe joint 205. By starting the threading pass behind recess 209, box end terminal surface 207 is effectively enlarged where it intersects with the thread cone area 221.

An invention has been provided with several advantages. A primary advantage of the present invention is that it allows the surface area of a box end terminal surface to be larger than its traditional surface area because of the overlapping of the thread cone area with the box end terminal surface. One result of this advantage is that the compressive and torsional resistance of the pipe joint are significantly increased. This is useful in oil drilling operations where pipe joints encounter both compressive and torsional forces due to pipe assembly, well bore obstructions, and running procedures during horizontal drilling. The method is simple to implement, does not add appreciably to the cost of the manufacturing operation, and results in a pipe connection which is reliable in use.

It should be apparent from the foregoing that an invention having significant advantages has been provided. While the invention is shown in only one of its forms, it is not just limited but is susceptible to various changes and modifications without departing from the spirit thereof.

We claim:

1. A method of manufacturing a pipe connection for connecting two pipes in a well bore, the method comprising:
   providing a plain end pipe having an outer surface, an inner surface, and a forward face on one end of the pipe;
   cutting a circumferential recess in the inner surface of the pipe, the recess being located axially within the pipe a selected distance from the forward face, a forward end of the recess being located rearward of the forward face, thereby defining an annular protuberance between the forward face and the forward end of the recess;
   positioning a thread cutting tool within the recess;
   cutting a plurality of internal threads into the inner surface, thereby creating a box member with an enlarged box end terminal surface, the internal threads adapted to mate with external threads of a pin member; and
   providing a mating pin member which, when matingly engaged with the box member creates the pipe connection.

2. The method according to claim 1, wherein the pin member is manufactured by the steps of:
   providing a second plain end pipe having an outer surface, an inner surface, and a forward face on one end of the pipe; and
   cutting a plurality of external threads into the outer surface to thereby create the pin member, the external threads of the pin member mating with the internal threads of the box member when the two pipes are connected.

3. The method according to claim 1 wherein the internal threads cut into the inner surface of the box member of the pipe begin only after the recess and continue axially away from the forward face to complete the thread form.

4. The method according to claim 1 further comprising beginning the threading pass for the inner surface of the pipe within the recess.

5. The method according to claim 1 wherein:
   each of the internal threads cut into the inner surface of the pipe have a root and a crest, the plurality of roots defining a root line and the plurality of crests defining a crest line, the root line and the crest line defining a thread cone area located therebetween; and
   the thread cone area intersecting with the forward face to create the enlarged box end terminal surface.

6. The method according to claim 5 wherein the box end terminal surface forms a forward surface of the annular protuberance.

7. A method of manufacturing a pipe connection for connecting two pipes in a well bore, the method comprising:
   providing a plain end pipe having an outer surface, an inner surface, and a forward face on one end of the pipe;
   profiling the one end of the pipe by machining the inner surface into a tapered surface and creating a box end terminal surface, the tapered surface being bounded axially on one end by the box end terminal surface and traveling axially away from the box end terminal surface;
   cutting a circumferential recess in the tapered surface of the pipe, the recess being located axially within the pipe a selected distance from the box end terminal surface, a forward end of the recess being located rearward of the forward face, thereby defining an annular protuberance between the forward face and the forward end of the recess;
   positioning a thread cutting tool within the recess;
   cutting a plurality of internal threads into the tapered surface, thereby creating a box member with an enlarged box end terminal surface, the internal threads adapted to mate with external threads of a pin member; and
   providing a mating pin member which, when matingly engaged with the box member creates the pipe connection.

8. The method according to claim 7 wherein the pin member is manufactured by the steps of:
   providing a second plain end pipe having an outer surface, an inner surface, and a forward face on one end of the second pipe;
   profiling the outer surface at the one end of the second pipe by machining the outer surface into a tapered surface, the tapered surface being bounded axially on one end by the forward face and on another end by an external shoulder; and
   cutting a plurality of external threads into the tapered surface to thereby create the pin member, the external threads of the pin member adapted to threadingly engage the internal threads of the box member when the two pipes are connected.

9. The method according to claim 7 wherein the internal threads cut into the tapered surface of the pipe begin only after the recess and continue axially away from the box end terminal surface to complete the thread form.

10. The method according to claim 7 further comprising beginning the threading pass for the tapered surface of the second pipe within the recess.

11. The method according to claim 7 wherein:
   each of the internal threads cut into the tapered surface of the pipe have a root and a crest, the plurality of roots defining a root line and the plurality of crests defining a crest line, the root line and the crest line having a thread cone area located between them; and the thread cone area intersecting with the box end terminal surface to create the enlarged surface area for the box end terminal surface.

12. The method according to claim 11 wherein the box end terminal surface forms a forward surface of the annular protuberance.

* * * * *